United States Patent [19]

Kell

[11] 4,050,330

[45] Sept. 27, 1977

[54] TRANSMISSION CONTROL WITH GOVERNOR DISCONTINUANCE CONTROL VALVE

[75] Inventor: Nathaniel B. Kell, Indianapolis, Ind.

[73] Assignee: General Motors Corporation, Detroit, Mich.

[21] Appl. No.: 741,222

[22] Filed: Nov. 12, 1976

[51] Int. Cl.² ............................................. F16H 57/10
[52] U.S. Cl. .................................................. 74/759
[58] Field of Search .................. 74/759, 761, 763, 755

[56] References Cited

U.S. PATENT DOCUMENTS

| | | | |
|---|---|---|---|
| 3,509,784 | 5/1970 | Mahoney | 74/759 X |
| 3,525,275 | 8/1970 | Lemieux | 74/763 |
| 3,730,022 | 5/1973 | O'Malley | 74/759 |

Primary Examiner—Edgar W. Geoghegan
Attorney, Agent, or Firm—Donald F. Scherer

[57] ABSTRACT

A transmission control for a multi-speed transmission having governor pressure controlled shift valves for controlling interchange of speed ratios. A downshift control valve is disposed in the transmission control between one shift valve and the automatic low speed ratio drive establishing device to prevent automatic downshifting to the low speed ratio from a higher speed ratio, separated therefrom by at least one step, upon sudden discontinuance of or reduction in governor pressure.

5 Claims, 3 Drawing Figures

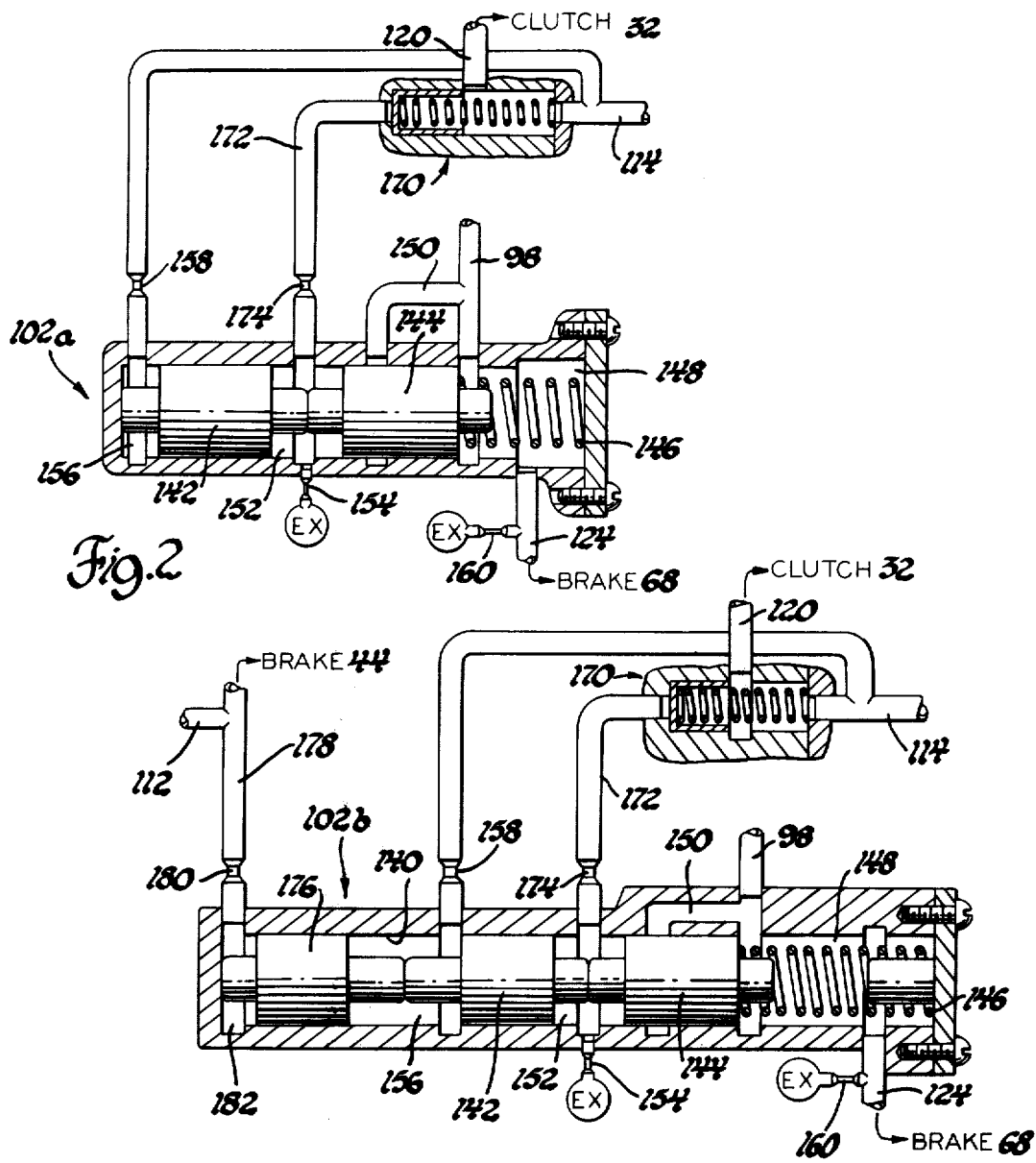

TRANSMISSION CONTROL WITH GOVERNOR DISCONTINUANCE CONTROL VALVE

This invention relates to automatic transmission controls and more particularly to transmission controls having a governor pressure sensitive shift pattern and a control valve for preventing unscheduled downshifting.

In conventional automatic shifting power transmissions, upshifts and downshifts are controlled by governor pressure and torque demand pressure. Governor pressure is proportional to vehicle speed and torque demand pressure is proportional to throttle setting, engine manifold vacuum or any signal representative of engine torque requirement. It is possible under abnormal driving conditions, such as slippery pavement, for the driving wheels to be held stationary, by the vehicle brakes, while the vehicle is moving forward with the transmission conditioned for a high speed ratio. When the vehicle drive wheels are stopped, the governor pressure is reduced to zero or a very low value which will result in the transmission automatically shifting down substantially immediately from the high speed ratio to the lowest speed ratio. If the wheels are then permitted to rotate, such as when the brakes are released or dry pavement is encountered, the engine and transmission components can be driven at a very high rotational speed unless the vehicle forward speed has also decreased during this interval.

The present invention prevents this unscheduled downshifting by conditioning the transmission to remain in the high speed ratio or in neutral upon a sudden discontinuance of governor pressure. Thus when governor pressure is restored the components will be driven at or below the normal speed. The transmission conditioning depends on which particular modification of the present invention is utilized as hereinafter explained.

It is an object of this invention to provide an improved transmission control for an automatic shifting multi-speed transmission wherein downshifting from a high speed ratio to the lowest speed ratio, upon a sudden discontinuance of governor pressure, is prevented.

Another object of this invention is to provide an improved transmission control for an automatic multi-speed transmission wherein upshifting and downshifting between speed ratios is accomplished through governor pressure controlled shift valves which supply fluid pressure to operate the friction devices in the transmission and wherein a downshift control valve is disposed between the shift valve controlling the lowest speed ratio and the lowest ratio reaction friction device and is responsive to fluid pressure distributed by a higher speed ratio shift control valve to prevent downshifting from the higher speed ratio to the lowest ratio upon sudden discontinuance of governor pressure.

A further object of this invention is to provide an improved control valve for an automatic transmission control wherein a ratio change to the lowest speed ratio upon sudden discontinuance of governor pressure, when the transmission is operating in a high speed ratio, is prevented and wherein the transmission may be conditioned to remain in the high speed ratio or changed to a neutral condition upon said discontinuance of governor pressure.

These and other objects and advantages of the present invention will be more apparent from the following description and drawings in which:

FIG. 2 is a modification of the present invention; and

FIG. 3 is a further modification of the present invention.

Figure 1:
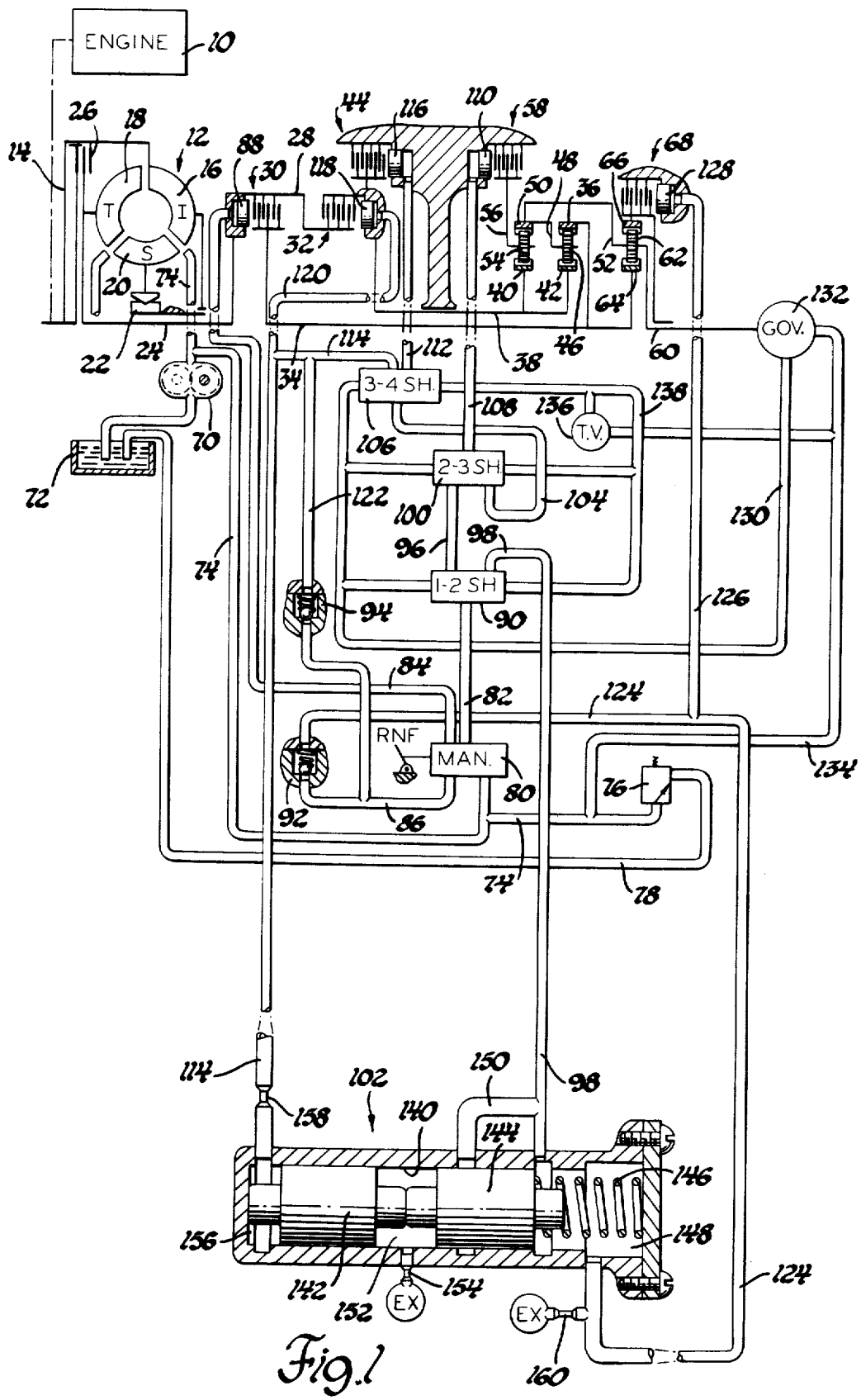
FIG. 1 is a schematic representation partially in block form incorporating the present invention.

Shown in FIG. 1 is a schematic representation of an engine 10 which is drivingly connected to a torque converter 12 through an input shell 14 which is secured to an impeller 16. The impeller 16 is in fluid flow relationship with a turbine 18, while a stator 20 is disposed between the impeller 16 and turbine 18. The stator is grounded to the transmission housing through a one way device 22. The turbine 18 is drivingly connected to a transmission input shaft 24, which transmission shaft 24 may be selectively connected to the input shell 14 through a lock-up clutch 26. The torque converter 12 and lock-up clutch 26 may be of any of the well known conventional units. Preferably the lock-up clutch is fluid operated.

The transmission input shaft 24 is drivingly connected to a clutch hub 28 which forms part of a forward clutch 30 and a direct-reverse clutch 32. The forward clutch 30 is drivingly connected to a shaft 34 which is secured to a ring gear 36. The direct-reverse clutch 32 is secured to a shaft 38 which is in turn drivingly connected to a pair of sun gears 40 and 42. The shaft 38 is also operatively connected to a brake 44 which is selectively operable to hold the shaft 38 and therefore sun gears 40 and 42 stationary. The sun gear 42 and ring gear 36 are both in mesh with pinion gears 46 which are rotatably mounted on a planet carrier member 48. The planet carrier 48 is secured to a ring gear 50, which ring gear 50 is drivingly connected to a planet carrier 52. The sun gear 40 and ring gear 50 are in mesh with planet pinions 54 which are rotatably mounted on a carrier 56 which is operatively connected to a brake 58. The brake is selectively operable to hold the carrier 56 stationary. The carrier 52 and therefore carrier 48 and ring gear 50 are drivingly connected to a transmission output shaft 60. Pinion gears 62 are rotatably mounted on the carrier 52 and mesh with a sun gear 64 and a ring gear 66. The sun gear 64 is drivingly connected to the shaft 34, and the ring gear 66 is operatively connected to a brake 68 which is selectively operable to hold the ring gear 66 stationary. The clutches 30 and 32 and the brakes 44, 58 and 68 are preferably hydraulically operated to control the operation of the planetary gear. The clutches, brakes and planetary gearing may be constructed in accordance with the transmission shown in U.S. Pat. No. 3,730,022 issued to J. J. O'Malley and assigned to the present assignee. The clutches and brakes are selectively operable to provide four forward speeds and a reverse speed.

The first forward speed is established by the engagement of brake 68 and clutch 30 while the remaining clutch and brakes are disengaged.

The second gear ratio is established by the engagement of brake 58 while brake 68 is disengaged and clutch 30 remains engaged.

Third gear is established by the engagement of brake 44 while brake 58 is disengaged and clutch 30 remains engaged.

Fourth gear is established by the engagement of clutch 32 while brake 44 is disengaged and clutch 30 remains engaged.

The reverse gear ratio is established by the engagement of clutch 32 and brake 68 while the remaining clutch and brakes are disengaged.

A more complete description of operation for the gearing can be found in U.S. Pat. No. 3,730,022.

The impeller 16 is drivingly connected to a hydraulic pump 70 which draws fluid from a reservoir or sump 72 and delivers fluid via passage 74. The passage 74 supplies fluid for operation of the torque converter 12 and also for operation of the transmission and control system. The fluid pressure in passage 74 is established by conventional pressure regulator valve 76. The overflow of regulator valve 76 is directed through passage 78 to the reservoir 72. The fluid in passage 74 is also directed to a manual selector valve 80 which may be conditioned for a plurality of drive ratios including forward, neutral and reverse.

The manual valve 80 may be of any conventional design and is operable to direct fluid to passages 82 and 84 when the forward drive is established and to passage 86 and 82 when the reverse drive is established. Passage 84 is connected to the engagement piston 88 of the forward clutch 30. Passage 82 is connected to a conventional 1-2 shift valve 90 and passage 86 is connected to a pair of one way check valves 92 and 94. The shift valve 90 and check valves 92 and 94 may be of any conventional design.

The 1-2 shift valve is connected to a pair of passages 96 and 98. The passage 96 is connected to a conventional 2-3 shift valve 100 and the passage 98 is connected to a downshift control valve 102. The 2-3 shift valve 100 has two passages connected thereto namely 104 which is connected to a conventional 3-4 shift valve 106, and passage 108 which is connected to an engagement piston 110 of brake 58.

The 3-4 shift valve 106 is connected to two fluid passages 112 and 114. The passage 112 is connected to the engagement piston 116 of the brake 44 and the passage 114 is connected to the control valve 102 and passage 120 which is connected to the engagement piston 118 of clutch 32. The downstream side of check valve 94 is connected to a passage 122 which in turn is connected to passage 114 and thereby to passage 120 and engagement piston 118. The downstream side of check valve 92 is connected to passage 124 which is in turn connected to the control valve 102 and via passage 126 to the engagement piston 128 of brake 68.

The upshift bias pressure on the shift valves 90, 100 and 106 is supplied by governor pressure in passage 130 which is supplied by a conventional hydraulic governor 132 which is operatively connected to the output shaft 60 of the transmission, thus generating a pressure proportional to output shaft speed. Fluid pressure is supplied to the governor via passage 134 which is in fluid communication with passage 74. The passage 134 is also connected to a conventional TV valve 136 which supplies a pressure signal to passage 138 which is proportional to throttle position or torque demand on the engine. The passage 138 is connected to each of the shift valves 90, 100 and 106 to supply a downshift bias signal thereto.

The control system described above may be any of the well known control systems which are presently available in the state of the art for controlling the automatic upshifting and downshifting of planetary transmissions. The planetary transmission may be expanded to include more forward speed ratios and accordingly the control system would be expanded to handle the additional shifting of such a system. For a description of the use of the present invention however a four speed planetary gearing is sufficient.

The downshift control valve 102 includes a valve bore 140 in which is slidably disposed a pair of valve plugs 142 and 144. The valve plugs 142 and 144 are urged toward the left end of valve bore 140 by a compression spring 146 as viewed in FIG. 1. In the spring set or unactuated position shown, passage 98 is connected to the spring chamber 148 which houses spring 146, as is passage 124. Passage 98 has a branch passage 150 which is connected to the valve bore 140 spaced from chamber 148 and, in the spring set position, is blocked by the plug 144. A space 152 between valve plugs 142 and 144 is connected through a restriction 154 to an exhaust passage which is connected to the reservoir or sump 72. A space 156 at the end of valve plug 142 and valve bore 140 is connected through a restriction 158 to the passage 114. The passage 124 is connected through a restriction 160 to an exhaust passage which in turn is connected to the reservoir 72. When the transmission is conditioned for the forward drive, the manual valve 80 connects passage 74 to passages 82 and 84 which in turn connects fluid pressure to the 1-2 shift valve 90 and the forward clutch 30. The 1-2 shift valve 90 is in the first ratio position and will therefore supply fluid pressure to passage 98, which fluid passes through the spring chamber 148 of valve 102 to passage 124 to engage the brake 68 and therefore condition the transmission for first or low gear operation. Depending on governor pressure and throttle valve pressure, the 1-2 shift valve will eventually upshift such that passage 98 is exhausted and passage 96 is pressurized. Fluid pressure in passage 96 is controlled by the 2-3 shift valve 100 to direct fluid pressure in the downshift position via passage 108 to engage the brake 58. The pressure in passage 98 is exhausted such that the brake 68 will be disengaged.

On further increases in governor pressure in passage 130, the 2-3 shift valve 100 will be upshifted such that passage 108 will be exhausted and passage 104 will be pressurized. Fluid pressure in passage 104 is directed through the 3-4 shift valve 106 to pressurize passage 112 which will enforce engagement of brake 144.

As the vehicle speed and therefore governor pressure continue to increase the fluid pressure in passage 130 will cause the 3-4 shift valve 106 to upshift, which will exhaust passage 112 and pressurize passages 114 and 120 which will enforce engagement of clutch 32 and condition the transmission for fourth or highest gear operation.

When the highest gear operation is established the passage 114 is pressurized, therefore the space 156 in valve 102 is pressurized. Fluid pressure in space 156 will cause the plug valves 142 and 144 to move to the right as shown in FIG. 1 against spring 146 to the pressure set or actuated position. The plug 144 as it is moved to the right will block passage 98 from spring chamber 148 and will open passage 150 to the space 152 between plug valves 142 and 144. While the transmission remains in high gear the control valve 102 will be thus positioned.

If the governor pressure in passage 130 should suddenly decrease, for example if the vehicle drive wheels are suddenly halted, the shift valves 90, 100 and 106 will assume their downshifted positions substantially simultaneously such that passage 98 will be pressurized while the other passages from the other shift valves are exhausted. When passage 98 is thus pressurized, passage 150 will be pressurized such that the space 152 is pressurized to maintain the plug 144 to the right against spring 146 thereby preventing fluid communication between passages 98 and 124 which will prevent the engagement of brake 68. The plug valve 142 will respond slowly to the decrease in pressure in passage 114, due to the restriction 158, thus maintaining the control valve 102 in the pressure set position for the time required for the pressurization of space 152 to maintain the control valve 102 in the pressure set condition. With the control valve 102 in the pressure set condition the brake 68 cannot be engaged and therefore the low ratio cannot be established in the transmission. With the arrangement described the transmission will then be conditioned for neutral operation since only clutch 30 is engaged at this time. If the brake 68 were permitted to be engaged the transmission components and the engine could be driven at a very high rotational speed which is not desirable. If the vehicle is brought to a halt at this time and the manual valve shifted from the forward to the neutral position which will exhaust passage 98 and 150, the control valve 102 will assume the spring set position. After this maneuver the manual valve can be again shifted to the forward position to continue vehicle drive operation. Thus the unscheduled downshifting from the higher ratio to the lowest ratio is not permitted through the use of a downshift control valve 102.

If the manual valve 80 is shifted to the reverse condition, passages 86 and 82 will be pressurized. Pressurization of these passages will permit the engagement of the clutch 32 and brake 68 which will condition the transmission for reverse operation. The control valve 102 is not effective during reverse drive since the passage 124 is pressurized through the one way check valve 92 thus bypassing the control valve 102.

FIG. 2 discloses a modification of the downshift valve 102 which has been designated 102a. The components and passages which were described for valve 102 in FIG. 1 carry the same numerical designation for valve 102a. The primary change in valve 102a is incorporation of a check valve 170 which is disposed between passage 120 and a passage 172 which is in fluid communication through a restriction 174 with space 152 between plugs 142 and 144. The control valve 102a will function the same as control valve 102 that is it will not be operable unless a rapid loss of governor pressure occurs when the transmission is operating in the high gear ratio. However, if such a reduction in governor pressure should occur, the fluid pressure directed by the 1-2 shift valve 90 to passages 98 and 150 will maintain plug 144 of control valve 102a in the pressure set position. The pressure in passage 150 however, will be directed to passage 172 to check valve 170. The check valve 170 will be opened permitting fluid communication between passages 172 and 120 thereby maintaining the clutch 32 engaged so that the transmission will remain in the high drive ratio permitting vehicle movement to continue upon this reduction in governor pressure. The check valve 170 also prevents the fluid in passage 120 from being exhausted through passage 114 and the 3-4 shift valve 106.

With programmed or conventional decreases in governor pressure the control system will function normally. With the control valve 102a, if the governor pressure is reestablished the control system will of course establish the proper ratio desired such that if the vehicle conditions do not require the continued establishment of the high gear ratio the fluid pressure in passage 98 will be reduced to zero unless first gear is to be established and therefore the pressure in passage 172 will reduce to zero through restriction 154 such that the clutch 32 can be disengaged if a drive ratio other than the high drive ratio is requested by the control system.

The pressure in passage 172 is exhausted at a controlled rate through restriction 154 to permit disengagement of clutch 32 if necessary.

Shown in FIG. 3 is a further modification of the downshifting control valve 102 which has been designated 102b. The components of this valve which are similar or comparable to those in valves 102 and 102a have been given the same numerical designation. As will be appreciated from viewing the control valve in FIG. 3 the modification consists of an additional plug valve 176 disposed between the plug valve 142 on the left end of the bore 140 and a passage 178 which is in fluid communication with passage 112 and through a restriction 180 with a space 182 formed between the end of valve bore 140 and plug valve 176. It should also be noted that space 156 is now disposed between plug valves 142 and 176.

The control valve 102b will operate similar to the control valve 102a with the exception that when the transmission is conditioned for a third gear ratio, namely brake 44 being engaged, the passage 178 will be pressurized thereby pressurizing the space 182 such that all three plug valves 142, 144, 176 will be moved to the right against spring 146 to disconnect passage 98 from passage 124. If the transmission is operating at third gear and a sudden discontinuance of governor pressure should occur which will permit the downshifting of the shift valves in the transmission control, the plug valve 144 will be maintained in the pressure set position against spring 146 such that fluid pressure in passage 98 from the 1-2 shift valve 90 will be directed through restriction 174, passage 172 and check valve 170 to passage 120 to establish the engagement of clutch 32, thus conditioning the transmission for the high drive ratio. The fluid pressure in passage 112 will of course be exhausted when the 2-3 shift valve is permitted to downshift due to the discontinuance of governor pressure. However, the plug valves 142 and 176 will be delayed in returning to their spring set positions due to the restriction 180. This permits the time required for the pressurization of the space 152 such that the clutch 32 can be engaged to maintain the drive ratio in the transmission.

Obviously, many modifications and variations are possible in light of the above teaching. It is, therefore, to be understood that within the scope of the appended claims the invention may be practiced otherwise than is specifically described.

What is claimed is:

1. A transmission control for controlling the interchange of a plurality of fluid actuated friction drive establishing devices in a power transmission comprising: a source of fluid pressure; first shift control valve means for controlling the operation of one friction drive establishing device to establish one drive ratio; second shift control valve means for controlling the operation of another friction drive establishing device to establish another drive ratio, said one drive ratio being a lower speed ratio than said other drive ratio; third shift control valve means for controlling a drive ratio intermediate said drive ratios controlled by said one and other friction drive establishing devices; governor means in fluid communication with said source and said first, second and third shift control valve means and being operable to generate a fluid pressure proportional to vehicle speed which pressure is operable on said shift control valve means to control operation thereof; and control valve means disposed in series flow relation between said first shift control valve means and said one friction drive establishing device, and in parallel flow relation with said second shift control valve means and said other friction drive establishing device, said control valve means having an actuated position for preventing fluid flow to said one friction drive establishing device and an unactuated position for permitting fluid flow to said one friction drive establishing device, said control valve means being moved to said actuated position when fluid pressure is directed to said other friction drive establishing device and being maintained in said actuated position to prevent an interchange from said other ratio to said one ratio if the pressure of said governor means decreases sufficiently rapidly to permit immediate operable interchange of said first and second shift control valve means.

2. A transmission control for controlling the interchange of a plurality of fluid actuated friction drive establishing devices in a power transmission comprising: a source of fluid pressure; first shift control valve means for controlling the operation of one friction drive establishing device to establish a low drive ratio; second shift control valve means for controlling the operation of two other friction drive establishing devices which establish one drive ratio separated from the low drive ratio by two steps and another drive ratio, said one drive ratio being a lower speed ratio than said other drive ratio; third shift control valve means and said one drive ratio for controlling a drive ratio intermediate said low drive ratio; governor means in fluid communication with said source and said first, second and third shift control valve means and being operable to generate a fluid pressure proportional to vehicle speed which pressure is operable on said shift control valve means to control operation thereof; and control valve means disposed in series flow relation between said first shift control valve means and said one friction drive establishing device, and in parallel flow relation via separate passages with said second shift control valve means and said two other friction drive establishing devices, said control valve means having an actuated position for preventing fluid flow to said one friction drive establishing device and an unactuated position for permitting fluid flow to said one friction drive establishing device, said control valve means being moved to said actuated position when fluid pressure is directed to either of said two other friction drive establishing devices and being maintained in said actuated position to prevent an interchange from said other driven ratio to said low drive ratio and permitting interchange from said one drive ratio to said other drive ratio and maintaining said other drive ratio if the pressure of said governor means decreases sufficiently rapidly to permit immediate operable interchange of said first and second shift control valve means.

3. In a transmission control for controlling the interchange of a plurality of fluid actuated friction drive establishing devices in a power transmission having at least four forward speed ratios; said control comprising: a source of fluid pressure; first shift control valve means havng a downshifted condition and an upshifted condition for controlling fluid flow to first and second of said drive establishing devices respectively to establish first and second forward speed ratios respectively; second shift control valve means having a downshifted condition and an upshifted condition for controlling fluid flow to the second and third of said drive establishing devices respectively to establish the second and third speed ratios respectively; third shift control valve means having a downshifted condition and an upshifted condition for controlling fluid flow to the third and fourth drive establishing means respectively to establish the third and fourth forward speed ratios respectively; governor pressure generating means for generating a fluid pressure proportional to vehicle speed and being operatively connected to each shift control valve means to urge the same toward the upshifted condition; and downshift control valve means disposed in series flow relation between said first shift control valve means and the first drive establishing device, and in parallel flow relation between said third shift control valve means and both the third drive establishing device and the fourth drive establishing device, said downshift control valve means having an actuated position for preventing fluid flow to the first friction drive establishing device and an unactuated position for permitting fluid flow to the first friction drive establishing device, said downshift control valve means being moved to said actuated position when fluid pressure is directed to said fourth friction drive establishing device and being maintained in said actuated position to prevent an interchange from the fourth speed ratio to the first speed ratio if the pressure of said governor means decreases sufficiently rapidly to permit substantially simultaneous downshifting of said first and third shift control valve means.

4. In a transmission control for controlling the interchange of a plurality of fluid actuated friction drive establishing devices in a power transmission having at least four forward speed ratios; said control comprising: a source of fluid pressure; first shift control valve means having a downshifted condition and an upshifted condition for controlling fluid flow to first and second of said drive establishing devices respectively to establish first and second forward speed ratios respectively; second shift control valve means having a downshifted condition and an upshifted condition for controlling fluid flow to the second and third of said drive establishing devices respectively to establish the second and third speed ratios respectively; third shift control valve means having a downshifted condition and an upshifted condition for controlling fluid flow to the third and fourth drive establishing means respectively to establish the third and fourth forward speed ratios respectively; governor pressure generating means for generating a fluid pressure proportional to vehicle speed and being operatively connected to each shift control valve means to urge the same toward the upshifted condition; and downshift control valve means disposed in series flow relation between said first shift control valve means and the first drive establishing device, and in parallel flow relation between said third shift control valve means and both the third drive establishing device and the fourth drive establishing device, said downshift control valve means having an actuated position for preventing fluid flow to the first friction drive establishing device and an unactuated position for permitting fluid flow to the first friction drive establishing device, said downshift control valve means being moved to said actuated position when fluid pressure is directed to either the third drive establishing device or the fourth drive establishing device and being maintained in said actuated position to prevent an interchange from the fourth speed ratio to the first speed ratio if the pressure of said governor means decreases sufficiently rapidly to permit substantially simultaneous downshifting of said first and third shift control valve means and being operable to direct fluid pressure from said first shift control valve means to the fourth drive establishing device for enforcing engagement thereof.

5. In a transmission control for controlling the interchange of a plurality of fluid actuated friction drive establishing devices in a power transmission having at least four forward speed ratios; said controll comprising: a source of fluid pressure; first shift control valve means having a downshifted condition and an upshifted condition for controlling fluid flow to first and second of said drive establishing devices respectively to establish first and second forward speed ratios respectively; second shift control valve means having a downshifted condition and an upshifted condition for controlling fluid flow to the second and third of said drive establishing devices respectively to establish the second and third speed ratios respectively; third shift control valve means having a downshifted condition and an upshifted condition for controlling fluid flow to the third and fourth drive establishing means respectively to establish the third and fourth forward speed ratios respectively; governor pressure generating means for generating a fluid pressure proportional to vehicle speed and being operatively connected to each shift control valve means to urge the same toward the upshifted condition; and downshift control valve means disposed in series flow relation between said first shift control valve means and the first drive establishing device, and in parallel flow relation with said third shift control valve means and the fourth drive establishing device, said downshift control valve means having an actuated position for preventing fluid flow to the first friction drive establishing device and an unactuated position for permitting fluid flow to the first friction drive establishing device, said downshift control valve means being moved to said actuated position when fluid pressure is directed to said fourth friction drive establishing device and being maintained in said actuated position to prevent an interchange from the fourth speed ratio to the first speed ratio if the pressure of said governor means decreases sufficiently rapidly to permit substantially simultaneous downshifting of said first and third shift control valve means and said downshift control valve means being operable to direct fluid pressure from said first shift valve means to the fourth drive establishing device to enforce engagement thereof.

* * * * *